US009886937B2

(12) United States Patent
Dicklin et al.

(10) Patent No.: US 9,886,937 B2
(45) Date of Patent: *Feb. 6, 2018

(54) COMPONENT AND METHOD FOR OVERLYING INFORMATION BEARING HEXAGONS ON A MAP DISPLAY

(71) Applicant: Root Wireless, Inc., Bellevue, WA (US)

(72) Inventors: Ron Dicklin, Kirkland, WA (US); Maciek Kozyrczak, Bothell, WA (US)

(73) Assignee: ROOT WIRELESS, INC., Bellevue, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/930,549

(22) Filed: Nov. 2, 2015

(65) Prior Publication Data

US 2016/0055832 A1   Feb. 25, 2016

Related U.S. Application Data

(63) Continuation of application No. 13/207,060, filed on Aug. 10, 2011, now Pat. No. 9,183,221.

(Continued)

(51) Int. Cl.
*G09G 5/377* (2006.01)
*G09G 5/02* (2006.01)
*G06F 17/30* (2006.01)
*G09B 29/00* (2006.01)
*G06T 11/00* (2006.01)

(52) U.S. Cl.
CPC ....... *G09G 5/377* (2013.01); *G06F 17/30241* (2013.01); *G06T 11/001* (2013.01); *G09B 29/003* (2013.01); *G09G 5/026* (2013.01)

(58) Field of Classification Search
CPC .... G06F 17/30241; G01S 5/06; G09B 29/003
See application file for complete search history.

(56) References Cited

U.S. PATENT DOCUMENTS 5,616,079 A   4/1997   Iwase et al.
6,711,404 B1  3/2004   Arpee et al.
(Continued)

OTHER PUBLICATIONS

Burrough et al., "Data Models and Axioms: Formal Abstractions of Reality," *Principles of Geographic Information Systems*, Oxford University Press, 1998, pp. 17-34.
(Continued)

*Primary Examiner* — Yuehan Wang
(74) *Attorney, Agent, or Firm* — Seed IP Law Group LLP

(57) ABSTRACT

The disclosure relates to a computer implemented method and component defining a plurality of data structures, each data structure having a plurality of data elements. The method and component associate the plurality of data structures with a geographic area wherein each data structure of the plurality corresponds to its own unique sub-part of the geographic area. Each data structure of the plurality is rendered as a corresponding one of a plurality of adjacent, non-overlapping, mathematically regular hexagonal shapes. Each data structure is configured for programmatic loading of the plurality of data elements and display characteristics of each hexagon are specified based on data stored in the data elements of the data structure corresponding to each hexagon.

23 Claims, 11 Drawing Sheets

Related U.S. Application Data

(60) Provisional application No. 61/372,831, filed on Aug. 11, 2010.

(56) References Cited

U.S. PATENT DOCUMENTS

| | | | |
|---|---|---|---|
| 2005/0035964 A1* | 2/2005 | Heenan | G06T 17/20 345/420 |
| 2007/0011617 A1 | 1/2007 | Akagawa et al. | |
| 2009/0326810 A1* | 12/2009 | Callaghan | G01C 21/26 701/532 |
| 2010/0118844 A1 | 5/2010 | Jiao et al. | |
| 2010/0285793 A1 | 11/2010 | Yoon et al. | |
| 2011/0250903 A1* | 10/2011 | Huang | G01S 5/0263 455/456.1 |
| 2011/0313649 A1* | 12/2011 | Bales | G01C 21/367 701/455 |
| 2012/0220308 A1 | 8/2012 | Ledlie | |

OTHER PUBLICATIONS

Carr et al., "Hexagon Mosaic Maps for Display of Univariate and Bivariate Geographical Data," *Cartography and Geographic Information Systems* 19(4):228-236 and 271, 1992.

Gilmer Jr., "Dynamic Variable Resolution in the QuickScreen Combat Model", Proceedings of the 1983 Winter Simulation Conference, ACM, pp. 597-602.

Smale, "Inkwell Ideas Hexographer," The Welsh Piper, Oct. 17, 2007, retrieved Feb. 22, 2014 from http://www.welshpiper.com/inkwell-ideas-hexographer/, 10 pages.

* cited by examiner

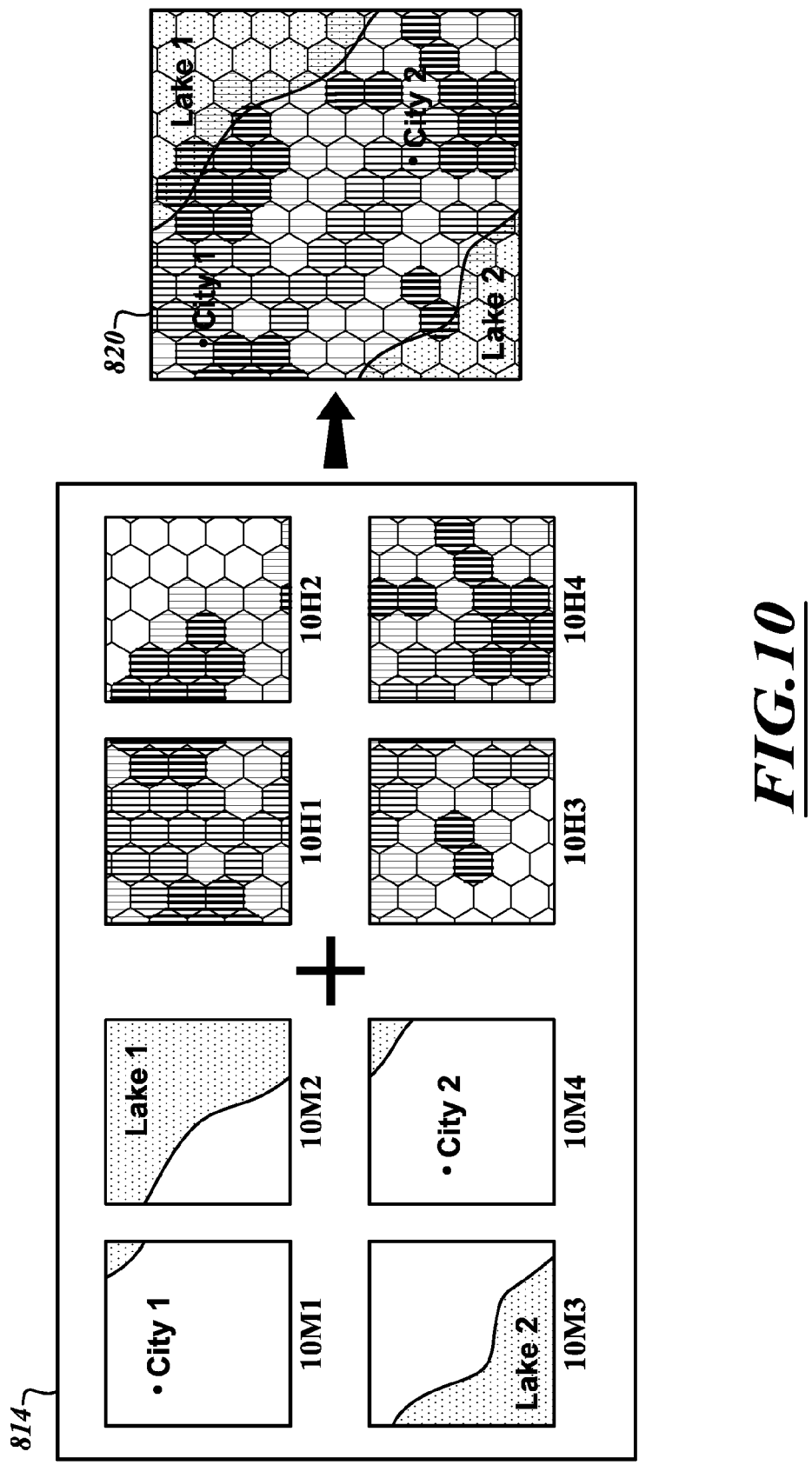

COMPONENT AND METHOD FOR OVERLYING INFORMATION BEARING HEXAGONS ON A MAP DISPLAY

CROSS-REFERENCE TO RELATED APPLICATIONS

This application is a continuation of U.S. application Ser. No. 13/207,060, filed Aug. 10, 2011, which claims the benefit of U.S. Provisional Patent Application No. 61/372,831, filed Aug. 11, 2010 and entitled COMPONENT AND METHOD FOR OVERLYING INFORMATION BEARING HEXAGONS ON A MAP DISPLAY, which are hereby incorporated by reference in their entirety.

BACKGROUND

Technical Field

The present disclosure relates to a component and method for producing a computerized display output wherein information bearing hexagons having common borders are rendered so as to appear above or below an underlying map.

Description of the Related Art

In the field of computer graphics, image data is output to a display device to provide information to the computer user. The generation of images or objects to be represented on the display device is conventionally referred to as rendering.

In some computer images, the information displayed is map data, which is useful to the computer user in many circumstances. For example, in some cases, the map data identifies geographic boundaries, natural or man-made structures, topography, and the like. In other cases, the information on the map is combined with additional information such as motion and weather. Overall, maps rendered on computer displays are very useful to the general public.

BRIEF SUMMARY

A computer-implemented method and component is taught. The method and component render a plurality of hexagons sharing common borders above an underlying map image. The hexagons may be scaled in relative or actual size either independently from, or cooperatively with, the underlying map image. The method and component may be configurable to permit control of the color, opacity, and other display characteristics of the hexagons. A configurable collection of information may be associated with each hexagon of the plurality.

In one use of the method, a map image is drawn on a computer screen. A static grid of polygon structures is rendered as an overlay on the map image. Each polygon in the grid may be used to convey information related to the geographic location that is below the polygon. For example, a certain neighborhood or city map can be drawn on the computer screen. A static grid of polygon structures is rendered as an overlay to the map. The polygons may be used to show the quality of cellular phone coverage in different areas of the city or neighborhood. For example, if one group of polygons is colored red, a user may recognize that cellular phone coverage in that area is poor. Alternatively, if a different group of polygons is colored green, the user may recognize that the cellular phone coverage in the area under the green polygons is good. In some cases, the polygons are formed as hexagons. In some cases, other information, such as population density, weather patterns, and restaurant selections may be conveyed. In fact, the overlying polygon grid can be used to convey many types of information that is geographically of interest wherein the display characteristics of the polygons can be used to distinguish information related to one geographic area from another geographic area.

In one embodiment, a computer implemented method of presenting information includes defining a plurality of data structures, each data structure having a plurality of data elements, and associating the plurality of data structures with a geographic area wherein each data structure of the plurality corresponds to its own unique part of the geographic area. Each data structure may be rendered as a corresponding one of a plurality of adjacent, non-overlapping, mathematically regular hexagonal shapes. The method also includes configuring each data structure for programmatic loading of the plurality of data elements, and specifying display characteristics of each hexagon based on data stored in the data elements of the data structure corresponding to each hexagon.

In another embodiment, a computing system includes a central processing unit, a memory, and an input/output port configured in hardware and software as several modules. The modules include a raw sample data collection module, a hexagon production module, a database module, a data providing module, and a tile service module. The hexagon production module is configured to define a plurality of data structures, each of the plurality of data structures being associated with its own unique sub-part of a geographic area, and associate a hexagon identifier with each of the plurality of data structures. The database module is configured to receive raw data samples from the raw sample data collection module, generate composite information samples from at least some of the raw data samples, and store each composite information sample in association with at least one hexagon identifier. The data providing module is configured to retrieve composite information samples from the database module, and generate aggregated composite information associated with one or more hexagon identifiers. The tile service module is configured to receive aggregated composite information from the data providing module, and generate at least one hexagon image file, the hexagon image file configured for overlay on an underlying map image file.

In still one more embodiment, a non-transitory computer-readable storage medium whose stored contents configure a computing system to perform a method is disclosed. The method includes generating at least one data structure that defines a static grid of addressable hexagon shapes, the static grid covering a certain geographical area, wherein each hexagon shape covers one portion of the certain geographical area, and each portion of the certain geographical area is covered by only one hexagon shape. The method further includes associating each addressable hexagon shape with an identifier that is unique within the computing system, and populating a first data structure associated with a first hexagon shape with data related to a first portion of the certain geographical area covered by the first hexagon shape. The method also includes forming an image overlay of hexagon shapes based on data stored in the at least one data structure, the image overlay configured for presentation on an electronic display.

BRIEF DESCRIPTION OF THE SEVERAL VIEWS OF THE DRAWINGS

Non-limiting and non-exhaustive embodiments are described with reference to the following drawings, wherein like labels and reference numerals designate corresponding parts throughout the several views unless otherwise specified. The sizes and relative positions of elements in the drawings are not necessarily drawn to scale. For example, the shapes of various elements and angles are not drawn to scale, and some of these elements are enlarged and positioned to improve drawing legibility in some cases. One or more embodiments are described hereinafter with reference to the accompanying drawings in which:

FIG. 10 illustrates one embodiment of map image files and hexagon image files brought together for presentation.

DETAILED DESCRIPTION

Figure 1:
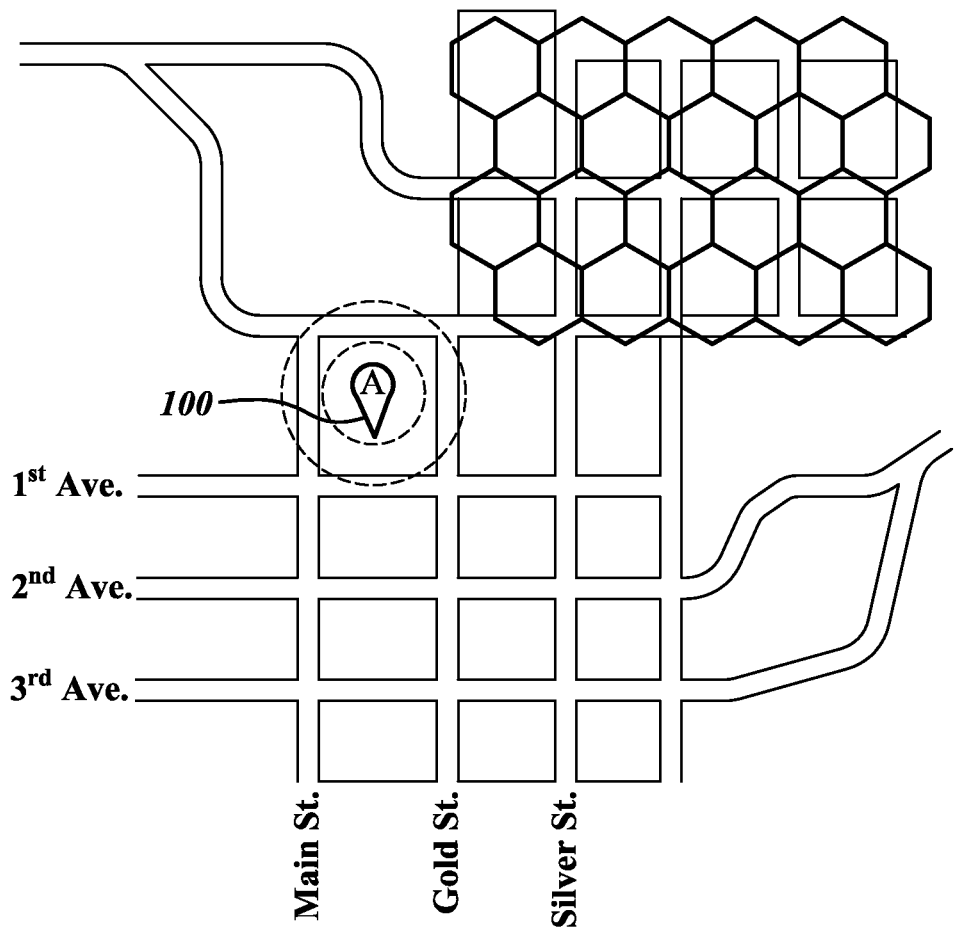
FIG. 1 illustrates a two-dimensional image of a map having particular features and presented on a display device.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and servicer computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense; that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

People use computer devices for business, pleasure, safety, and many other reasons. In some cases, the computerized devices are intended for stationary use, and in other cases, the computerized devices are intended for mobile use. One common factor is that the computerized devices often have a display used to communicate information to the device user.

In many cases, users select mapping information to be shown on the display of their computerized device. It has been recognized that a map on a display could be overlaid with additional information that is beneficial to the user. In particular, a user would find it beneficial for the additional information overlaid on the map to be related to the geographic area that the map represents. Heretofore, there has not been a convenient, scalable mechanism to provide beneficial information to users of computerized devices that are presented on maps on their device's display.

In the non-limiting embodiments described herein, information may be described as being rendered above, below, or otherwise in conjunction with an underlying two-dimensional map. It is to be appreciated that the term "underlying" in all of its forms is merely used to describe that which is visually perceived by a user. For example, in some cases, the rendered information may appear to be below the map. In other cases, the rendered information may appear to be above or even a part of the map. The particular order and mechanisms employed to generate the underlying map and the rendered information are each within the scope of the embodiments described herein. Accordingly, an underlying map is one that is rendered before, after, or at the same time as the related information.

In nonlimiting embodiments described herein, information is described as being rendered with a two-dimensional map overlaid with hexagons. Two-dimensional maps and hexagons are representations of planar shapes and images. Nevertheless, it is to be appreciated that the scope of the embodiments and claims described herein are not limited to planar shapes and images. Accordingly three-dimensional maps and three-dimensional hexagonal components are also within the scope of the embodiments and claims described herein.

In non-limiting embodiments described herein, users of mobile devices are interested in the quality of network communication services provided for their mobile devices. For example, signal strength of a cellular communications network is a useful indicator of the quality of the cellular communications network.

It is to be appreciated that the embodiments described herein with respect to cellular communication networks and mobile devices are merely non-limiting examples of how information related to particular geographic areas can be efficiently presented to users. Any other type of information related to particular geographic areas can also be presented with the apparatus and methods described herein. For example, weather information, commercial activity information, educational information, cultural information, transportation information, and many others can also be presented with the apparatus and methods described herein. Further, the type of information presented can take nearly any form. The information may include statistics, actual data points, predictions, and any other type of information.

On a mobile device, measured signal strength is very closely related to the geographic location of the mobile device with respect to one or more cellular transceivers that the mobile device will communicate with. That is, the signal strength of a cellular network relevant to a mobile device is affected by the distance between the cellular transceiver and the mobile device, the terrain between the cellular transceiver and the mobile device, the atmospheric conditions around the cellular transceiver and the mobile device, the number of mobile devices competing for access to the cellular transceiver, the time of day, and many other factors. Often, greater signal strength indicates a higher the quality of communications between the mobile device and the cellular transceiver.

Another useful indicator of the quality of the cellular communications network is the speed at which data can be passed through the cellular network. The speed at which data can be passed through a cellular network is often measured in bits per second. A higher rate of data transfer through the cellular network is often perceived an indication of a higher-quality cellular network.

Still another useful indicator of the quality of the cellular communications network is the reliability of call connections. For example, a cellular network that drops calls by unexpectedly and abruptly severing connections between a mobile device and another device is perceived as having low quality. Users of mobile devices perceive the reliability of the cellular network as related to how frequently calls are dropped.

In the same manner as described with respect to signal strength, other useful indicators of the quality of a cellular communications network are often tied to a particular geographic location of the mobile device. Accordingly, presenting cellular network information to a user may be aided by presenting the information in accordance with a geographic map. That is, when the user views a map of a particular geographic area, information related to the cellular network can also be presented by rendering the cellular network information on top of or below the underlying geographic map.

In embodiments of the present invention, several shapes have been studied for overlay onto a two-dimensional map. A regular shape that scales well and tiles well was sought. That is, regular shapes that could completely cover a two-dimensional map with no overlap and with no gaps were studied.

For many reasons, substantially equilateral hexagons are chosen over triangles, squares, rectangles, and other shapes. One reason that hexagons are chosen is that a hexagon is a tileable shape that closely approximates a circle. In many applications, mapping applications for example, a circle is a desirable shape to approximate.

As is known to those of skill in the art, many global positioning system (GPS) devices create a non-zero uncertainty estimate as a circle of probable presence around the GPS calculated location. That is, when a GPS device operates to identify its present location, the device calculates a specific location and generates one or more uncertainty factors related to the correctness of the calculated location. The uncertainty factors are valid in a circular area around the calculated specific location. By choosing a hexagon as a tileable shape, each hexagon's close approximation to a circle allows particular hexagons to overlap GPS uncertainty factor circles in a calculable and deterministic way.

FIG. 1 illustrates a two-dimensional image of a map having particular features and presented on a display device. In FIG. 1, a particular GPS calculated location 100 is illustrated as a ballooned point referenced with a letter A. Two concentric circular areas about reference point A illustrate uncertainty factors in the calculated location 100. The uncertainty factors are also known as circles of probable presence around the calculated location 100.

Another reason that hexagons are chosen to present information on a display is that a group of adjacent hexagons can completely cover a two-dimensional map with no overlap and with no gaps. That is, the hexagons can be arranged such that each interior side of a hexagon can border one interior side of another hexagon (wherein an "interior" side is one of the six sides of a hexagon that is not on an outer boundary of a grouping of hexagons, but is instead sharing a border with another hexagon). By arranging the hexagons in such a way over a two-dimensional image rendered below, then the entire image rendered below can be completely covered. One example of hexagons arranged in such a manner is shown in FIG. 1.

FIG. 1 illustrates a simplified rendering of a street map. A group of adjacent hexagons are shown in FIG. 1 as overlaid on part of the street map. The approximation of a hexagon to a circle is readily apparent. The ability of the hexagon shape to cover the street map when so arranged with adjacent interior sides is also readily apparent. In FIG. 1, only a small number of hexagons are illustrated, but it is clear that the entire street map in FIG. 1 could be covered with hexagons.

Another aspect of FIG. 1 is that the "honeycomb" pattern created by the adjacent hexagons may be extended to also cover the calculated location 100 and the circles of probable presence around the calculated location 100. In such a case, one or more hexagons would engulf or overlap the circles of probable presence. When particular information is known about each hexagon relative to the underlying map, then additional information may be determined or presented that is related to the calculated location 100.

In one embodiment scalable hexagons are tiled to cover a two-dimensional map rendered on an electronic display screen. In such an embodiment, the two-dimensional map may be re-rendered under the direction of a user to increase or decrease the geographic area that is illustrated. That is the user may zoom in on the map to show a "close up" view of a particular area or zoom out on the map to show a "far out" view of the particular area. In the embodiment, when the user zooms in or zooms out, the relative size of the tiled hexagons may or may not also change.

For example, in some cases, when a user zooms in, the size of the tiled hexagons may appear to grow in proportion to the zooming in and appear to shrink in proportion to the zooming out. In such a case, each hexagon is perceived as covering a fixed geographic area. When the user zooms in, the displayed size of each hexagon will naturally grow. When the user zooms out, the displayed size of each hexagon will naturally shrink.

In other embodiments, the size of the tiled hexagons may appear to stay the same in proportion to the zooming. For example, when a user increases the granularity of the map image by zooming in for a close up view, the size of each hexagon overlaid on a map stays the same. In this case, the overlaid map image on the computerized display will appear to show that each hexagon covers a smaller and smaller geographic area. Conversely, when the user zooms out for a farther out view of the map, the fact that the size of each hexagon does not change makes it appear that each hexagon covers a greater geographic area.

Figure 2:
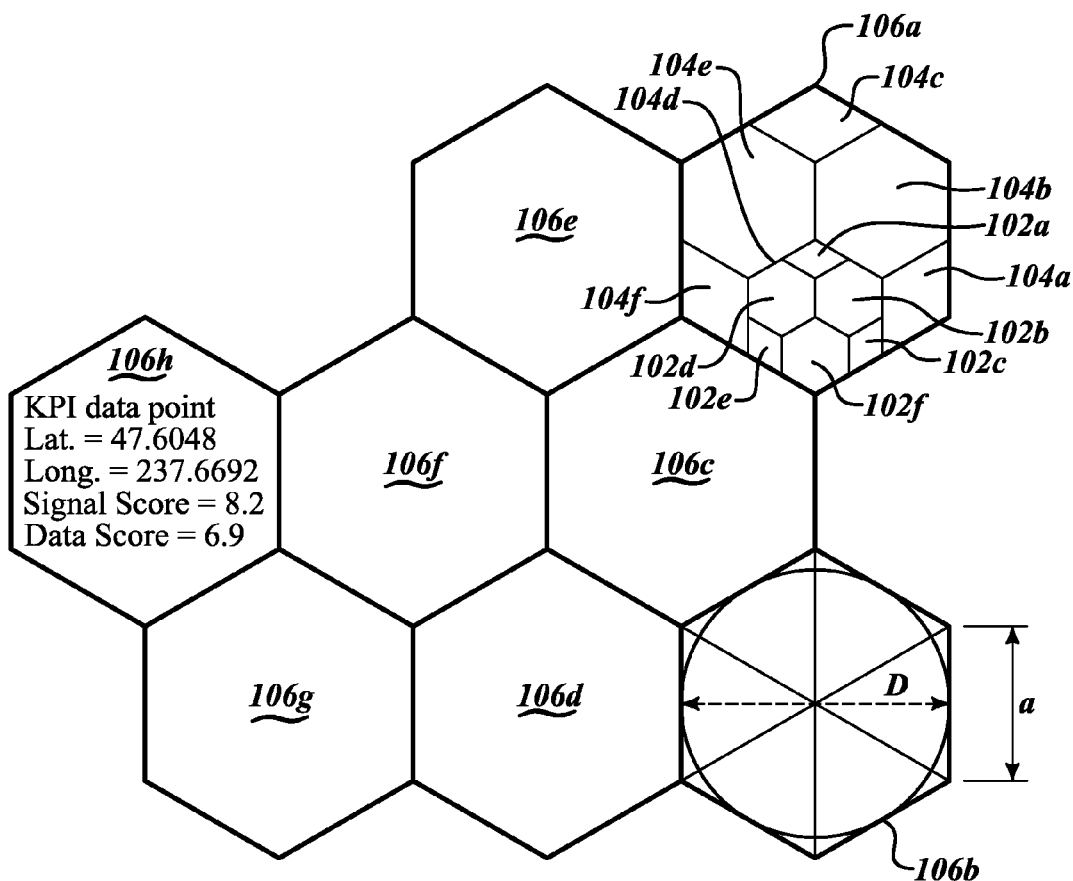
FIG. 2 illustrates a hexagon formed honeycomb pattern with additional detail about the hexagons.

FIG. 2 illustrates a hexagon formed honeycomb pattern with additional detail about the hexagons. FIG. 2 illustrates a relationship between hexagons of various sizes. For example, hexagon shapes 102*a-f* have a small size, hexagon shapes 104*a-f* have a mid-size, and hexagon shapes 106*a-h* have a large size. Although mathematically, any six sided polygon may be called a hexagon, the hexagons of the embodiments discussed herein are mathematically regular hexagons. In a mathematically regular hexagon each of the six sides has the same length and each adjacent side of the regular hexagon is formed at 120°. In addition, the size of the hexagons and the created honeycomb pattern can be scaled up or down to any desired size. The dimensional scaling of the hexagons is mathematically performed in a known way. Similarly the angular relationship between each hexagon means that multiple hexagonal patterns can be overlaid on each other. Thus, information that is applicable to a wide geographic area can be represented by one hexagon and information that is applicable to a smaller geographic area can be represented by another hexagon.

The scalability of the regular hexagonal shapes permits information relative to any contiguous geographically sized area to be related to a single hexagon. Accordingly, a single calculated location 100 of an underlying map can be related to the information represented by one or more hexagons that overlap the single calculated location. In other embodiments, the scalability of the regular hexagonal shapes permits a geographic area of nearly any shape and size to be covered by one or more hexagons.

In one embodiment, when the two-dimensional map and the overlying hexagons are rendered on the electronic display, the overlying hexagons are visually represented as one honeycomb pattern. Further examination of each displayed hexagon in the pattern may retrieve information from overlapping hexagons that are not displayed.

In another embodiment, the area and boundaries of each displayed hexagon in the pattern are calculated. Further examination of each displayed hexagon in the pattern may retrieve information that is relevant to the geographic area related to the displayed hexagon. For example, hexagon 106h illustrates a presentation of particular key performance indicator (KPI) information related to the geographic area underlying the hexagon. The information in FIG. 2 includes latitude and longitude, signal strength, and a composite data score; however, any other information may also be presented. Additionally, the information in FIG. 2 is shown as located within hexagon 106h, but the information may be presented in many other ways, such as a child window, a hover-over bubble, a click-through, and the like. In such a case, the information retrieved may be stored and indexed according to its geographic location.

When hexagons are presented over an underlying two-dimensional map, the hexagons may provide an aggregate representation of many individual samples or data points. One reason that hexagons are chosen is that presenting information related to individual samples creates an image that is visually "choppy." In many cases, the volume of information makes it difficult for a user to form a good mental picture of the represented data. For example, when the information presented is related to the quality of a cellular communications network, presenting individual samples of data would make it very difficult for a user to form an understanding of the quality of the cellular communications network in particular geographic areas. By aggregating data and using hexagon shapes, the amount of raw data presented to a user is reduced and the amount of visible sampling noise or other clutter that is in the data is also reduced.

In some embodiments the hexagon-rendering systems are separate from the raw data sample systems. That is, one system can be used to collect individual samples (e.g., data points), another system can be used to analyze and process the samples, and still another system can be used to present the data to a user. Any of the systems may be standalone systems, or the systems may be consolidated into a single system. Alternatively, the embodiments described herein may be distributed amongst two or more systems.

In the non-limiting embodiments described herein, the collection and processing of raw data is described with respect to a data collection system, and the presentation of mapping and hexagonal data is described with respect to a presentation system. This separation of such systems may allow for particular specialization of hardware for particular purposes or may allow for commoditized hardware to be adapted to a particular purpose. The data collection system and the presentation system described herein may or may not share hardware.

With respect to the creation of individual hexagons and groups of hexagons, the computations and data structures are generally populated with initialization data. Subsequently, the computations and data structures will be supplemented with real data. In some cases, the computation and update of data is continuous and incremental. In other cases, the computation and update of data is scheduled. In still other cases the computation and update of data is driven by a particular event, e.g., receipt of new data, rendering of a new map, and user input.

In some embodiments the computed hexagons are fixed in two-dimensional space relative to fixed geographical locations represented on the underlying map. Each hexagon is given an identifier (e.g., a HexID) that is unique within the scope of the system. In such embodiments each of the world's landmasses may be tiled into a static grid of addressable hexagons.

In some embodiments, each hexagon will represent the exact same geographic size. In some embodiments, hexagons will have a scaling value that represents the relative size of one hexagon to other hexagons. In some embodiments, the identification of hexagons is related to a geographic location that may be a landmass or a body of water.

In embodiments where information presented with hexagons is related to cellular networks and mobile devices, information is collected by particular data collection systems. The information is organized as key performance indicator (KPI) samples. The KPI information is received by the data collection system and in some cases, tagged with time and geographic indicators.

The data collection system is generally capable of providing data processing services on the collected KPI information. For example the data collection system may aggregate and store or index new batches of KPI samples into virtual buckets. "Bucketizing" data samples is an industry term used to describe the organization and indexing of raw data into particular groups by any known method. In some cases the data collection system bucketizes new batches of KPI samples by a particular time frame (e.g., hours, days, etc.) or TimeStamp. In some cases the data collection system assigns particular buckets of data to one or more HexIDs.

As KPI data is collected by the data collection system, one or more indicators that correspond to collected and processed data may be created. For example if the data collection system determines that a data sample (e.g., a bucket) comprises a new HexID/TimeStamp pair, a new hourly aggregation for that HexID may be created. When new HexID/TimeStamp pairs are created, particular flags or indicators may be set to direct the presentation system to update. In other cases updating by the presentation system is scheduled or triggered in some other manner. In such embodiments, particular computations result in a series of hourly aggregation (measures) grouped by HexIDs that contain KPI sample data.

The hexagons may be rendered in many different ways. One manner of representing the hexagons is by defining a plurality of data structures and associating each data structure with one hexagon. In such cases, each data structure can be associated with its own unique sub-part (i.e., portion) of a particular geographic area. Each data structure may have a plurality of data elements, and each data element may be programmatically loaded with information related to its corresponding geographic area.

In some embodiments, the presentation system renders hexagons on two-dimensional maps via Mercator projection. In other embodiments different mapping techniques may be used. For example, direct volume rendering techniques, parametric correspondence and chamfer matching techniques, and other mapping techniques may be used. When the presentation system renders hexagons via Mercator projection, each hexagon can be rendered as one of a plurality of adjacent, non-overlapping, mathematically regular hexagonal shapes. Each hexagon in such cases will share at least one and up to six segment boundaries with one and up to six adjacent hexagons.

In one embodiment where Mercator projection is used, the Mercator projection distorts the map features as a function of longitude. In this case, the generated static hexagon grid has counter distortion computed in. The computed counter distortion permits hexagons to appear to be approximately equilateral regardless of which longitude is being viewed.

When querying the presentation system for information, users may view hexagon data through a view port defined by a map window. The map window is generally directed by user controls. The geographic location rendered by the map window is directed by user input or some other means. In many cases, the map window may be scaled up or down by the user.

When the initial geographic coordinates for the map window are determined, the presentation layer will query the static grid to retrieve the HexIDs for each hexagon that will be visible in the viewport. The HexID data points may then be queried to retrieve the data of all of the visible hexagons.

Additionally, the data related to each HexID may be flattened to a particular time range. For example, a user may be interested in data only for a previous 24 hour period. Alternatively, a user may be interested in data from one or more days in the past. The data retrieved may be processed so as to present a historical, present, or projected representation of any timeframe stored in the database. In many cases, up to 24 hourly measures for each visible hexagon may be combined into a single measure representing each hexagon in the last day in question.

In one embodiment, where an underlying map and rendered hexagons are displayed via a view port, the rendered hexagons present information related to particular geographic areas on the map. When the view port is zoomed in, fewer hexagons are visible and each hexagon appears larger. By making each hexagon larger, fewer hexagons will be visible through the view port, and the fewer, larger hexagons permit a user to interact with each hexagon. For example, a user may be able to click on, highlight, mouse over, or otherwise select one or more hexagons.

Once a hexagon is selected, any number of actions may be available via the presentation system. For example, information related to the hexagon may be presented, the hexagon or its information may be tagged, hyperlinks may be taken, micro-zooming may be enabled, or any other action or process of may occur.

When the view port is zoomed out, more hexagons are visible and each hexagon appears smaller. In some cases, the number of hexagons may be too large to render on the client. In such cases, the interactivity between a user and the hexagons may be reduced or on available. Alternatively, some number of hexagons may be aggregated and rendered as larger hexagons where each of the larger hexagons covers a larger geographic area than previously rendered.

In some cases, the hexagons are rendered on the client device. In other cases the hexagons are rendered on this server side. Often, a zoomed in view with a low number of hexagons is conducive to client side rendering. The client side rendering can provide smoother visual transitions of map views and improved interactivity with each hexagon.

Often, a zoomed out view with a large number of hexagons is conducive to server side rendering. When the hexagons are rendered on the server side, they may be tiled and presented as a static image above an underlying map. In one embodiment, the server side rendered hexagons are tiled to a particular zoom level and sized to always take about the same number of hexagons to cover the view port at each zoom level. In such a case, when a tile is selected, the view port may be zoomed in, and the rendering may be transitioned from the server side to the client side. A transition back to the server side from the client side and may occur when the user zooms out.

The presentation system may have one or more subsystems for particular analysis and processing of data that is presented via the hexagons. The analysis and processing subsystem may stand alone or may be combined with other parts of the presentation system. Further, the particular analysis and processing subsystem may have other individually identifiable hardware and software components to implement various presentation system functions.

For example, an extrapolation subsystem may be part of the presentation system. Generally speaking, an extrapolation subsystem is used to generate or supplement data where it otherwise may not exist. In a cellular communications network quality embodiment, the extrapolation subsystem may be used to calculate information about the cellular communications network in areas where actual data may be stale, sparse, unreliable, or otherwise deemed unavailable.

In one embodiment, where particular KPI information or other derived information is identified with individual hexagons, the individual hexagons may have some level of sparsity. The sparsity, if not processed, would generally appear as one or more "holes" in the underlying map. To alleviate the "hole" effect in a particular geographic area, the hexagon data from surrounding hexagons may be extrapolated. The extrapolation processing may occur on the server side or the client side.

Figure 3:
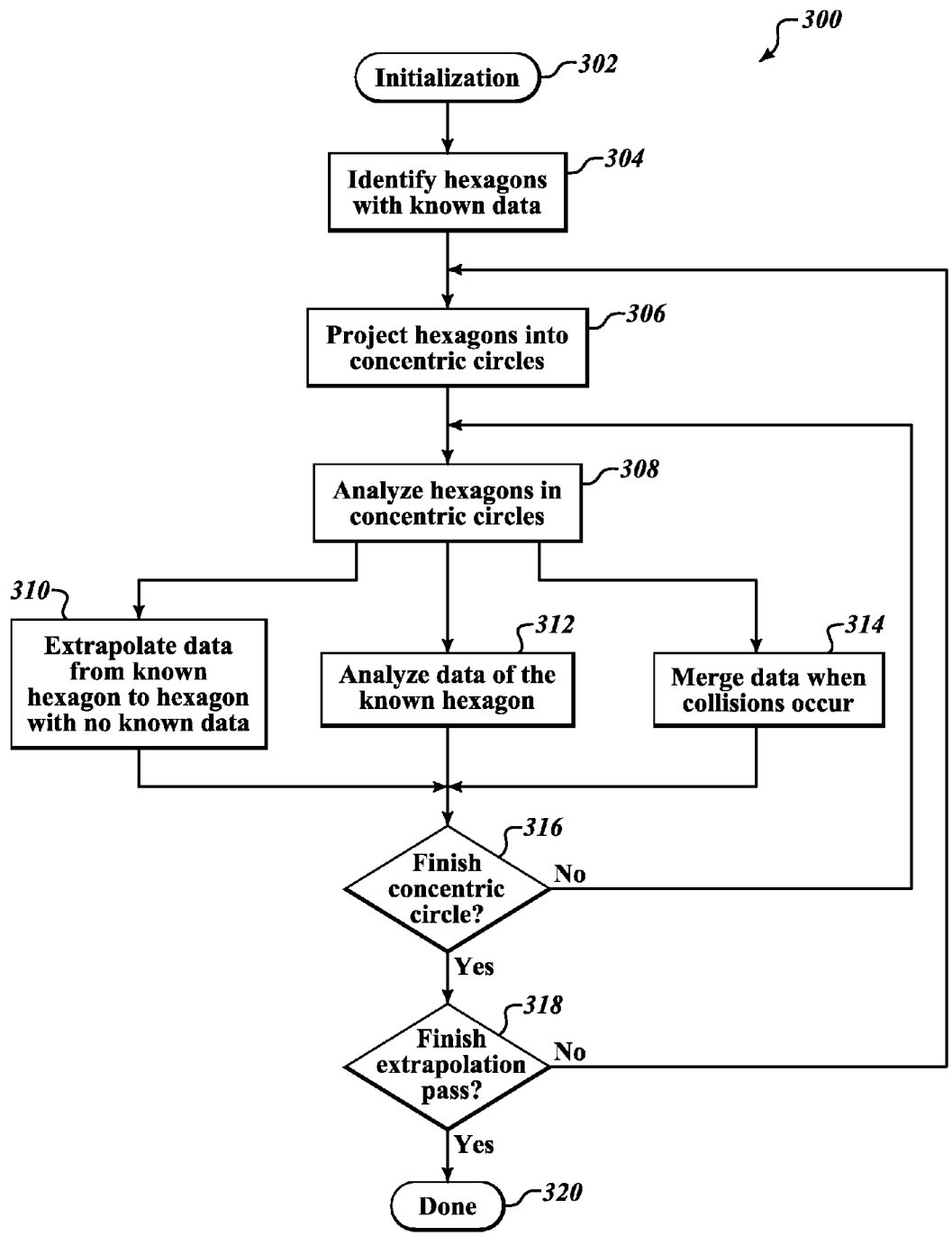
FIG. 3 illustrates a flow chart of one extrapolation processing algorithm.

The extrapolation processing may be described by way of one or more algorithms. FIG. 3 illustrates a flow chart of one extrapolation processing algorithm 300. At 302 the extrapolation algorithm is initialized. The initialization may involve setting up particular data structures, providing original values for variables, spawning various programs or programming routines, accessing various databases or other information repositories, and the like as known to those skilled in the art.

At 304, a particular hexagon having known data is identified. In one embodiment, the particular hexagon having known data may be identified as part of an ongoing process. In another embodiment, the particular hexagon having known data is identified by the user. In still another embodiment, the particular hexagon having known data is identified based on the geographic area displayed in the view port.

At 306, the extrapolation algorithm virtually projects the known data of the identified hexagon into two concentric circles of hexagons around the identified hexagon. Since each hexagon has six sides, the first concentric circle will have six hexagons. Each of the projected six hexagons in the first concentric circle will share one side of the known data hexagon. Subsequently, the second concentric circle will have 12 additional hexagons.

Figure 4:
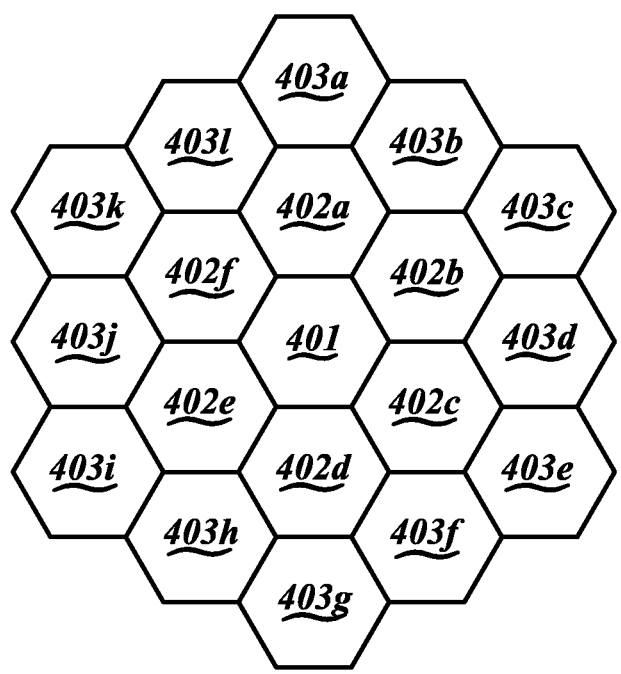
FIG. 4 illustrates a plurality of hexagons under process as part of an extrapolation algorithm.

FIG. 4 illustrates a plurality of hexagons under process as part of an extrapolation algorithm. FIG. 4 illustrates a known hexagon 401. A first concentric circle is formed of six hexagons 402a-402f. A second concentric circle is formed of twelve hexagons 403a-403l.

During normal processing of the extrapolation algorithm, the hexagons of the concentric circles are not newly created specifically for the concentric circles. Instead, the hexagons of the concentric circles are the same hexagons tiled into a static grid as described herein. That is, each hexagon of the concentric circle is a hexagon having a previously associated HexID. Accordingly, the virtual projection of the concentric circles may be accomplished by any known means. For example, the virtual projection of the concentric circles may be accomplished by loading a flat data structure, by determining each subsequent HexID of the respective concentric circle until each hex ID is identified, or by some other means.

At 308, hexagons in the concentric circles are analyzed. Each hexagon in a concentric circle may be further analyzed based on its HexID. At 310, a hexagon in the concentric circle has no data. In such a case, the data from the known hexagon may be copied to or otherwise associated with the hexagon under analysis. For example, with reference to FIG. 4, hexagon 402b may be analyzed and discovered to have no data. In such a case, the data from known hexagon 401 may be copied to or associated to hexagon 402b. The data now associated with hexagon 402b may be appropriately flagged as extrapolated data. Further, in some cases, the data now associated with hexagon 402b may be appropriately flagged as sourced from hexagon 401. In other cases, the data now associated with hexagon 402b may be appropriately flagged as having a particular extrapolation level, such as +1 to indicate its data came from an adjacent hexagon, or +2 to indicate its data came from a hexagon one step removed from an adjacent hexagon.

At 312, it may be determined that a hexagon in the concentric circle has original data. For example, hexagon 402e may be analyzed and determined to have associated KPI data related to the quality of the cellular communications network at a particular geographic location. The KPI data may be related to a single data point or aggregated from data of several data points. The KPI data may have a particular TimeStamp. In some cases, the original data is left unchanged. In some cases, the original data associated with the HexID is updated or otherwise processed. For example, if the original data is determined to be very old, the data may be weighted, updated, or otherwise modified with information from the known hexagon.

At 314, it may be determined that a hexagon in the concentric circle has data that was modified as the result of a previous extrapolation step. In such a case, called an extrapolation collision, the data associated with the hexagon in the concentric circle will be updated. In some cases, the data is newly calculated. In other cases, the data is merged.

For example, if hexagon 403h is under analysis, it may be determined that hexagon 403h has been already been loaded with data from a previous extrapolation step. Several factors may affect how the data in hexagon 403h is processed. In the present example, hexagon 403h is two steps removed from the known hexagon 401. If the data currently stored in hexagon 403h was previously loaded with the data from a two steps removed hexagon different than the known hexagon 401, then the data currently associated with hexagon 403h may be merged in equal weight with the data of known hexagon 401. Alternatively, if the data currently stored in hexagon 403h was previously loaded with the data from a one step removed hexagon different than the known hexagon 401, then the data currently associated with hexagon 403h may be merged in half weight with the data of known hexagon 401. Accordingly, it may be seen that data associated with each hexagon may frequently be updated according to data provided by the data collection system.

Described differently, each hexagon in a first concentric circle about a known hexagon is given a factor of +1. Each hexagon in a second concentric circle about a known hexagon is given a factor of +2. When the data associated with each hexagon in a concentric circle is updated, the newly updated data is also tagged with a +1 or a +2 respectively. Subsequently, in a new extrapolation sequence, when data in a hexagon is found to be tagged with a +1 or a +2, the tag will be used to determine how the hexagon will be updated in the new extrapolation sequence.

For example, a hexagon in a new extrapolation sequence is one step removed from the known hexagon. If the hexagon in the new extrapolation sequence has data that was tagged +1, then the data from the known hexagon is giving equal weight to the existing data of the hexagon in the new extrapolation sequence. Alternatively if the hexagon in the new extrapolation sequence has data that was tagged +2, then the data from the known hexagon is given twice the weight as the existing data of the hexagon in the new extrapolation sequence. It is readily apparent that any number of concentric circles may be formed about one hexagon, and data in a hexagon under analysis may be updated according to a weighted formula or any other formula according to various levels of influence provided by nearby hexagons.

The rendering of hexagons above an underlying map may be adjusted based on the data associated with each hexagon. That is, the color, intensity, hue, opacity, texture, border, or any other visual display characteristic of one or more hexagons may be adjusted based on the data associated with hexagon. For example, in some cellular network quality embodiments, KPI data that indicates a high quality network in a particular geographic area may direct the rendering of hexagons and the geographic area to have a green color. The intensity or hue of each hexagon may be adjusted according to known or calculated values of predetermined KPI. In areas where cellular network quality is perceived to be poor, the associated hexagons may be red. In areas where no cellular network quality has been determined, the hexagons may have outlined borders only and otherwise appear to be clear.

After the analysis of hexagons in concentric circles is carried out via the acts of 308 and via the acts associated with at least one of 310, 312, and 314, processing passes to 316. If each hexagon in the particular concentric circle has been analyzed, processing passes to 318; else, processing returns to 308 where analysis of another hexagon in the concentric circle continues. At 318, if the extrapolation algorithm is not complete, then processing advances back to 306 wherein either a second concentric circle of hexagons is analyzed or wherein data of a new chosen hexagon is projected into two new concentric circles. Alternatively, at 318, if the extrapolation algorithm is complete, processing ends at 320.

Figure 5:
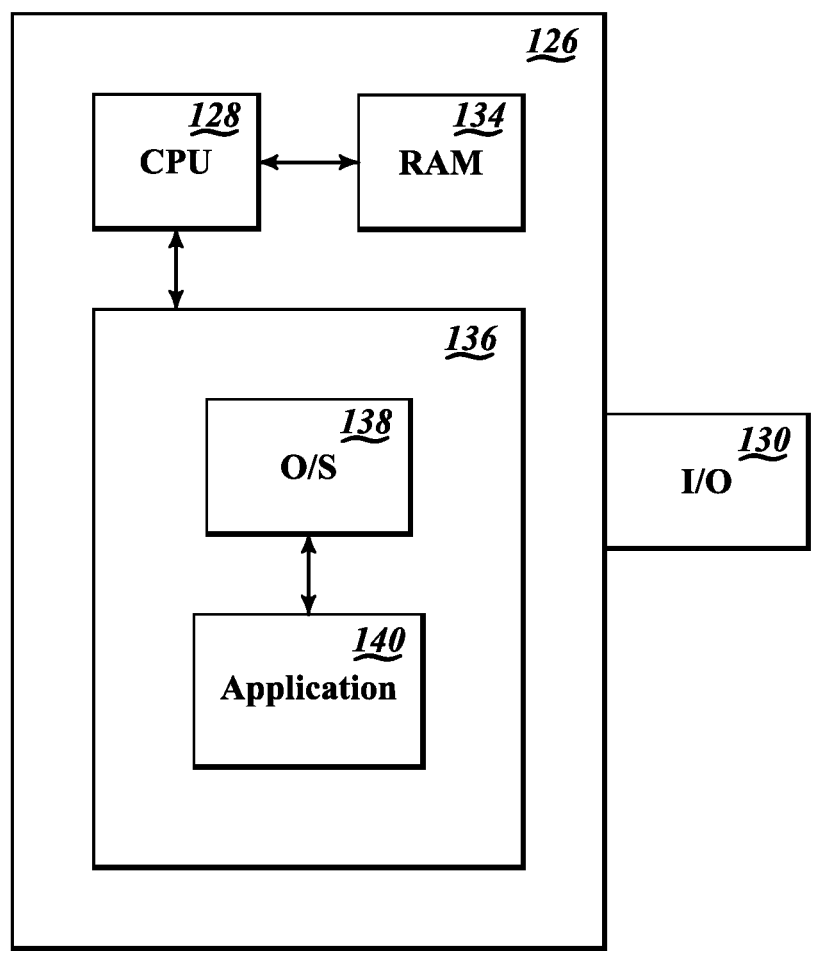
FIG. 5 illustrates a computing device configured to implement a presentation system.

FIG. 5 illustrates a computing device 126 configured to implement a presentation system. Computing device 126 has operative electronic circuitry including a central processing unit 128 (CPU), multiple input/output (I/O) ports 130, volatile memory 134 (e.g. RAM), and non-volatile memory 136 (e.g. ROM). Within the ROM 136, several software programs are resident including an operating system 138 and a presentation application 140.

The CPU 128 of the computing device 126 retrieves and executes instructions from ROM 136 and/or RAM 134. The operating system 138 includes application and driver software that permits additional application software and system administrators to control the operation of the computing device 126. For example, particular applications and drivers are used to accept user input and to provide system output through I/O ports 130. That is, keypads, computer mice, memory cards, serial ports, bio-sensor readers, touch screens, and the like are all useful to a programmer, system administrator, or other computing device operator to provide control information into the computing device 126. Displays, printers, memory cards, LED indicators, speakers, and the like are all useful to present output information to the computing device 126 operator.

In addition to application and driver software within the operating system 138, operating system 138 hosts a presentation application 140. In one embodiment, the presentation application 140 is capable of processing data and rendering hexagons such as described with reference to FIG. 3. The data may be processed and the hexagons rendered for presentation on a local display, on a display coupled through a network (e.g., the Internet), or on a mobile device.

The presentation application 140 may be implemented as a collection of one or more software programs capable of communicating with other computing devices. For example, conventional transmission control protocol/Internet protocol (TCP/IP), file transfer protocol (FTP), user datagram protocol (UDP), and the like are useful to permit data such as web pages to be served to outside computing resources, and further are useful to permit users of the outside computing resources to input data into the computing device 126. That is, the operating system 138 and presentation application 140 may be bi-directionally coupled to outside computing resources via directly connected input devices, local area network (LAN) connections, wide area network (WAN) connections, personal area network connections (PAN), or any other wired or wireless network-capable device connection. The outside computing resources include mobile devices, conventional user computers, computing servers, and the like.

The presentation application 140 is typically stored as one or more files on computer-readable media (CRM). The CRM is non-transitory, and configured to store computing instructions executable by a CPU. Each file may include one or more computer programs or may be part of a larger computer program. Alternatively or in addition, each file may include data or other computational support material for the presentation application 140. The presentation application 140 typically executes a set of instructions stored on computer-readable media.

Figure 6:
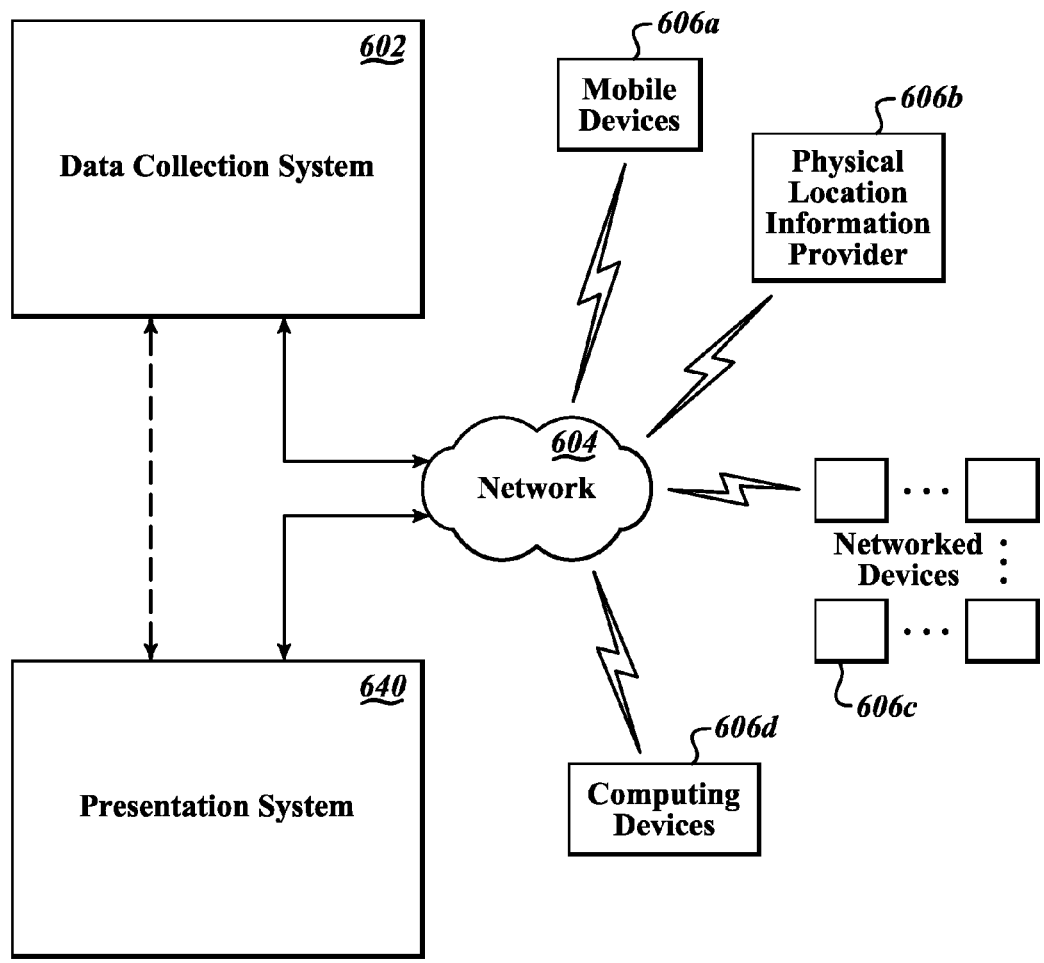
FIG. 6 illustrates a system having a data collection system and a presentation system.

FIG. 6 illustrates a system having a data collection system 602 and a presentation system 640. The presentation system may be the type of presentation system 140 as described herein that presents information through hexagons overlaid on a map. The presentation system of FIG. 6 may receive information for presentation directly from a data collection system 602 or from a wide range of other devices 606a-d.

Often, when the presentation system 640 of FIG. 6 receives information from a particular data collection system 602, the information is prepared in a format expected by the presentation system 640. The information may be encoded for security or other reasons. The information may be presented in the form of known data structures or the structure format may itself be contained in the communicated information.

One or more networks 604 may be used as a communication path between the presentation system of FIG. 6 and other devices. The network 604 may be wired or wireless. The network 604 may include what is conventionally described as the Internet, and additional network communication hardware and software may also be included.

In the system illustrated in FIG. 6, various devices 606a-d provide and consume information to and from the data collection system 602 and the presentation system 640. In some embodiments, the information is particular network quality data representative of various network quality key performance indicators. Examples of devices include one or more mobile devices 606a such as cell phones, personal digital assistants, portable network devices, and the like. Additional examples include physical location information provider 606b devices such as those found in retail shopping locations, warehouses, corporate offices, etc. Another type of information device includes a small or wide network 606c that is typically closed to other unknown devices. In such cases, the closed network 606c devices can provide information to the data collection system 602 individually, through a single device, or in any other combination. As can readily be seen in FIG. 6, any other type of computing device 606d may be used to provide and consume information to and from the data collection system 602 and presentation system 640.

Figure 7:
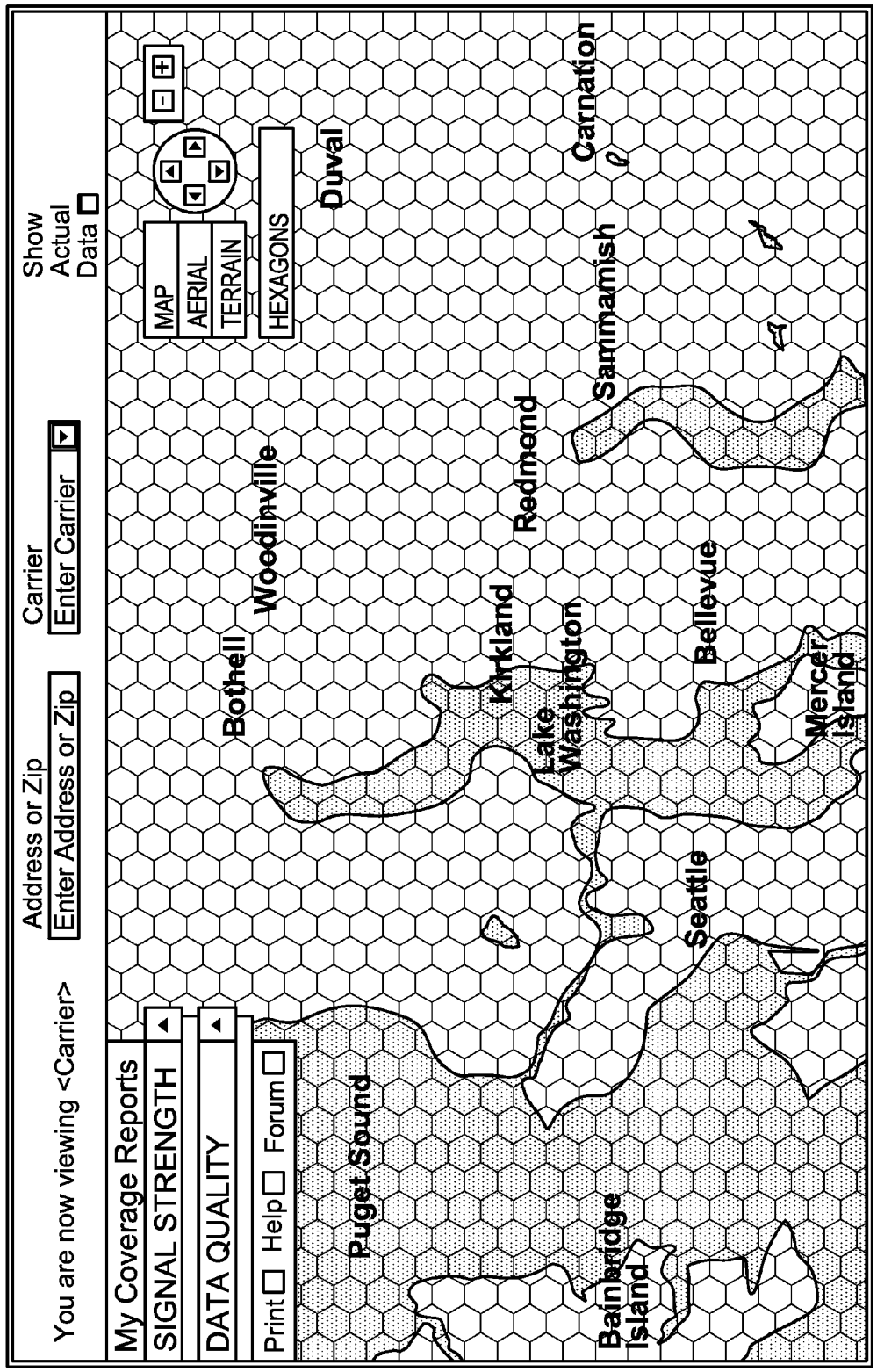
FIG. 7 illustrates one representation of the output of a presentation system as described herein.

FIG. 7 illustrates one representation of the output of a presentation system as described herein. FIG. 7 depicts a geographic area as a two dimensional map. The map is overlaid with a plurality of opaque, adjacent, mathematically regular hexagons. The hexagons are shaded, colored, or otherwise textured to provide information. The map shown in FIG. 7 may be zoomed in or out. The map may be "dragged" to view different geographic areas. One or more hexagons may be selected by a user in order to gather, provide, or present particular information. In some cases, when the underlying map is re-sized, the hexagons may or may not be re-sized.

Figure 8:
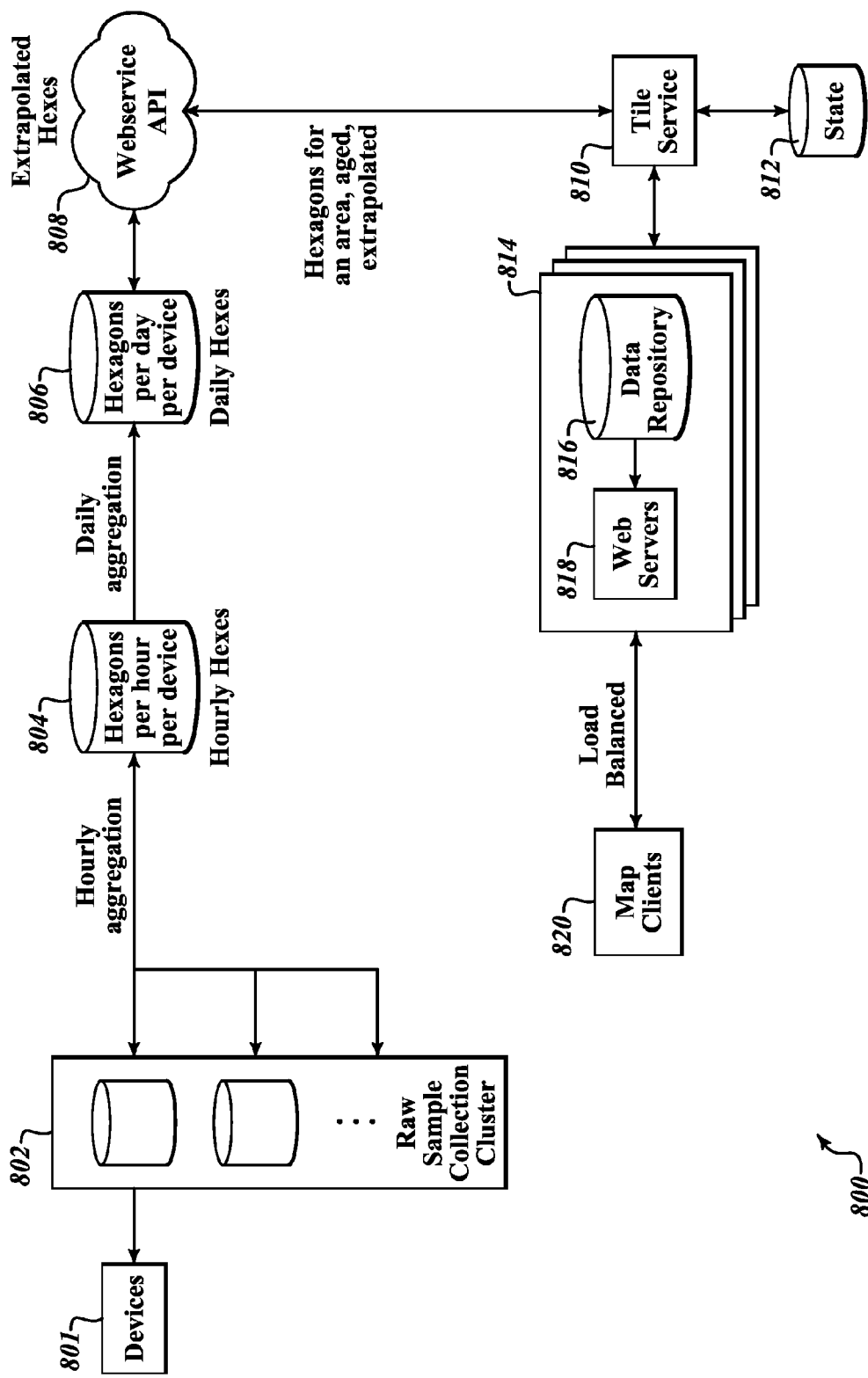
FIG. 8 illustrates a production pipeline that may be implemented to analyze data for the presentation of one or more hexagons.

FIG. 8 illustrates a production pipeline 800 that may be implemented to analyze and generate data for the presentation of one or more hexagons. In FIG. 8, various illustrative representations are made for computing cluster modules, database and database operation modules, service modules, storage repository modules, and other modules. The modules illustrated may include hardware (e.g., a CPU, memory, I/O ports, etc.), software, or computing devices having both hardware and software configured to carry out the operations of the module. In some cases, the modules share hardware and software, and in other cases, the modules use dedicated hardware, dedicated software, or some combination.

In the embodiment of FIG. 8, the production pipeline 800 is capable of assigning data to a plurality of virtual hexagons that cover a geographic area. The virtual hexagons may be presented on the display of a computing device as an overlay to an underlying map image. The virtual hexagons may have the form of the hexagons illustrated in FIG. 2, wherein the adjoining hexagons cover the geographic area without overlap.

In one embodiment, the entire earth has been mapped with a virtual overlay of adjoining hexagons. The hexagons are of substantially equal size and may appear as hexagons 106a-106h of FIG. 2. The virtual overlay of hexagons may be perceived as a pre-computed static grid of hexagons over the earth. In this embodiment, each geographic location on the earth (or geographic area subset of the earth) can be associated with a single hexagonal shape. Further, a data structure associated with each hexagon may be used to store, deliver, and present information related to the certain geographic area below the hexagon.

A virtual hexagon production module may be configured to define one or more data structures. Each data structure can be associated with its own unique sub-part or portion of a geographic area (e.g., the whole earth). The virtual hexagon production module may also associate one hexagon identifier with each of the plurality of data structures. Each hexagon identifier is typically unique within the production pipeline. Each hexagon identifier may also be associated with the unique sub-part of the geographic area that corresponds to a single hexagonal shape.

Mathematically, the hexagons may be approximated to be exactly the same size, however, it is understood that the planar representations of hexagons on the substantially spherical earth permits some variation in the actual hexagon size. For example, such variation may be due to Mercator projection distortion as described previously. Accordingly, the mathematically regular hexagonal shapes described herein include hexagonal shapes that may or may not be distorted in such manner.

In one embodiment, each hexagon covers about 37,412 meters squared (i.e., each side "a" of a hexagon is 120 meters long). In a different embodiment, each hexagon covers about 12,471 meters squared (i.e., the diameter "d" of a hexagon is 120 meters). In other embodiments, each hexagon may cover an area of some other size. In still other embodiments, the virtual hexagons may be scaled in size such as hexagons 102a-f, 104a-f, 106a-h.

In one embodiment, the earth is parsed into about 41 million unique hexagons. The surface area of the earth is about 510,072,000 km². In such an embodiment, each hexagon has a diameter of about 120 meters. When the surface area of the earth is divided by the area of each hexagon, the result of the calculation yields about 40,901,417 hexagons.

In another embodiment, for example when data is particularly associated with land-masses and not water, the substantial surface area of the earth that is covered by water is not mapped. By limiting the hexagon grid to only land-masses, the number of formed and identified hexagons may be reduced to about 12-15 million (or some other number based on hexagon size). Techniques that recognize an opportunity to avoid mapping certain areas with hexagons typically permit faster access to databases and smaller databases. In the embodiment, the land-masses of the earth, which may include some certain distances extending into the water, cover about 148,940,000 km² of the earth. In the embodiment, each hexagon has a diameter of about 120 meters. The surface area of the earth's land mass is divided by the area of each hexagon, which results in about 11,943,132 hexagons.

Each hexagon in the overlay has a unique identifier (i.e., a HexID that is unique within the system and methods described herein). Accordingly, each hexagon, by its HexID, can be related to a single, particular geographic area on the earth. In this manner, particular data can be linked to a certain single geographic area and stored in a database. The HexID associated with the data can be used to store the data in the database, and the HexID can be further used to retrieve data from the database. In addition, when hexagons are presented on a display over an underlying map, the data associated with each hexagon can further be presented on the display device.

Data generated by the production pipeline 800 may be used to populate a hexagon such as the KPI data illustrated in FIG. 2. In such cases, the unique identifier of each hexagon is used as an index or other identifier to store and retrieve data from a database. The stored data is representative of data collected within the geographic area of the map that is underlying the particular hexagon.

In some embodiments, the production pipeline 800 includes a particular data collection system used to gather and process information related to cellular networks and mobile devices. The illustrated production pipeline 800 may, for example, carry out one or more steps of the extrapolation processing algorithm of FIG. 3 to produce the plurality of hexagons shown in FIG. 4. The illustrated production pipeline 800 may be implemented in whole or in part by a computing device 126 (FIG. 5). For example, application 140 may perform the acts of one or more modules of the production pipeline 800 of FIG. 8. In some embodiments, the illustrated production pipeline 800 may be implemented by the data collection system 602 and presentation system 640 of FIG. 6, which may be consolidated in a single computing device or distributed among two or more computing devices.

In the production pipeline 800 of FIG. 8, devices 801 provide data to a raw sample collection cluster 802, which is configured to collect raw sample data. The raw sample data will be analyzed, processed, and used to populate hexagons that are displayed as an overlay on a map. In some embodiments, the data is KPI data such as location information, signal strength, data throughput, dropped call rate, and the like. Data from raw sample collection cluster 802 is aggregated in an optional "hexagons per hour per device" (HPP1) database 804. Data from the HPP1 database 804 is aggregated in an optional "hexagons per day per carrier" (HPP2) database 806. Extrapolated hexagon data is retrieved from HPP2 database 806 by a web-service API 808, processed, and provided to a tile service 810. Tile service 810 supplies data to a state database 812 and a computing cluster 814. The computing cluster 814 includes a data repository 816 and web server modules 818. Map clients 820 provide input to web server modules 818 and receive hexagon data tiles from web server modules 818. The map clients present map images and hexagon data tiles as overlays on underlying map images. Individual modules and processing of production pipeline 800 are described in further detail.

In some, but not all, embodiments, devices 801 are cell phones, PDAs, or other like personal communication appliances such as mobile devices 606a (FIG. 6). Devices 801 can provide raw data that is processed, analyzed, and organized as key performance indicator (KPI) samples related to the performance of the device 801 and the network environment (e.g., network 604, FIG. 6) in which device 801 operates.

Devices 801 collect data samples. The data samples may, for example, be measures of wireless signal strength, data throughput speed, dropped call measurements, or other data related to wireless communications. Alternatively, the data samples may be related to other technologies, devices, or operations. Each data sample represents data from a particular geographic point that is captured on a particular day at a particular time.

In the embodiment of FIG. 8, data is captured by one or more devices 801 and collected by the raw sample collection cluster 802. The raw sample collection cluster 802 may be one or more computing devices configured to provide database functionality. In some embodiments, the raw sample collection cluster 802 receives sample data from an associated measuring device, and each sample represents a measurement taken from a recorded geographic location at a recorded point in time. In some cases, data samples are provided by the device at the time the sample is recorded. In other cases, the measuring device records and stores two or more samples and later sends a group of samples to the raw sample collection cluster 802.

The raw data samples can be grouped in many ways. For example, the raw data samples can be grouped by device, by unit of time (e.g., per hour, per day, and the like), by data type, or by some other characteristic or combination of characteristics. In one embodiment, which is illustrated in FIG. 8, data from the raw sample collection cluster 802 is aggregated in a "hexagons per hour per device" database HPP1 804 as data per hour per device.

Also illustrated in FIG. 8, a "hexagons per day per carrier" database HPP2 806 is used to stored data that has been further aggregated. The HPP2 database functions permit data associated with a particular geographic area to be stored and retrieved in a known way.

The raw sample collection cluster 802, HPP1 database 804, and HPP2 database 806 may all be configured in a single computing server device, or processing may be distributed across two or more computing server devices (e.g., data collection system 602 of FIG. 6). In some embodiments, tens of thousands of data samples or more are received and processed by the raw sample collection cluster 802. The data is analyzed and flattened for storage in the HPP1 database 804. The data is further flattened for storage in the HPP2 database 806. The raw sample collection cluster 802, HPP1 database 804, and HPP2 database 806 may also operate as the virtual hexagon production module described herein.

Figure 9A:
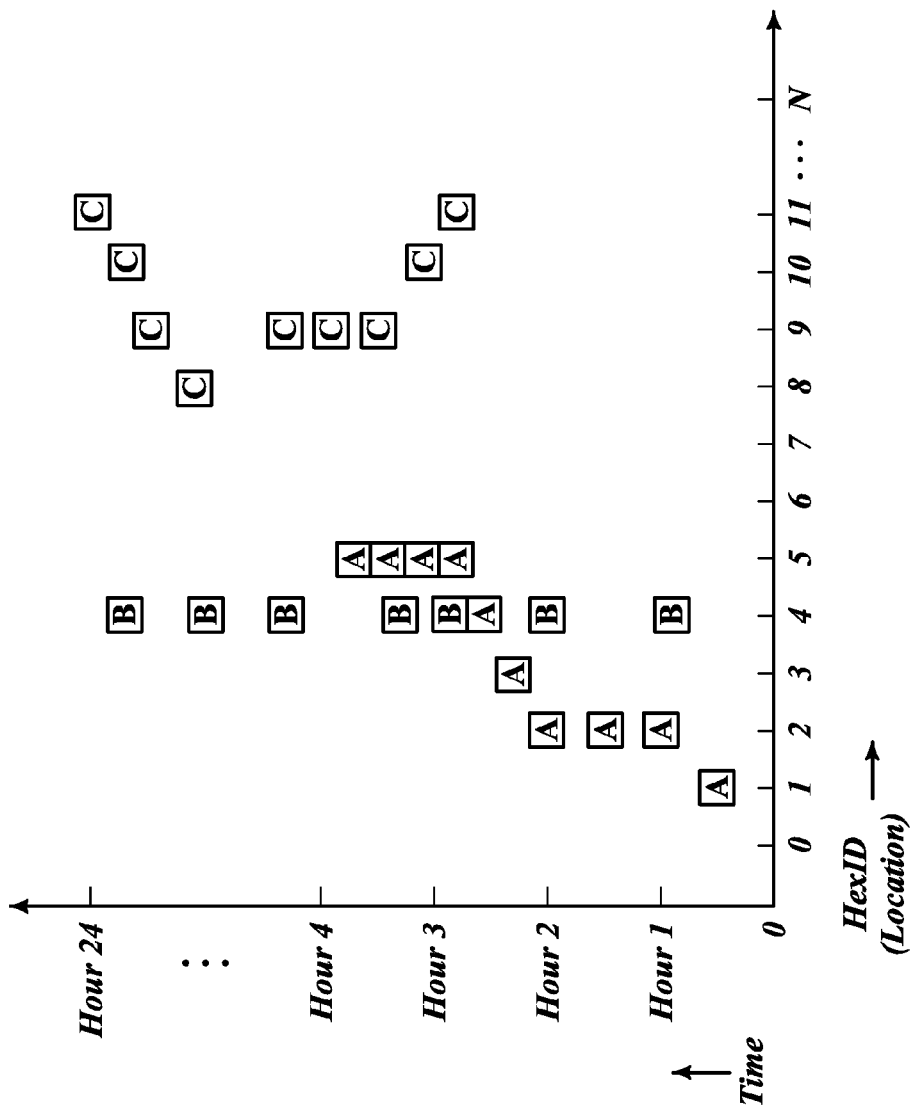
FIG. 9A shows a simplified representation of data flattened in a hexagons per hour per device (HPP1) database.

FIG. 9A shows a simplified representation of data flattened in a "hexagons per hour per device" (HPP1) database 804. Data in the HPP1 database 804 is processed from data collected by the raw sample collection cluster 802. In some embodiments, each data sample in the HPP1 database 804 can be traced back to the one or more data samples from the raw sample collection cluster 802 used to derive the HPP1 data sample.

In the embodiment illustrated in FIG. 9A, raw sample data is stored in the HPP1 database 804 according to the time that the sample was recorded. In some cases, data samples are provided to the raw sample collection cluster 802 by a measurement device at the time the sample is recorded. In other cases, the measuring device records two or more samples and then sends a group of samples to the raw sample collection cluster 802 at a later time. In this manner, the HPP1 database 804 stores data in a stacked manner wherein more recent samples from a certain location are "stacked" on top of older samples from the same location. In subsequent processing, the more recent samples may be given more weight during analysis.

In FIG. 9A, data samples are provided by devices 801 (FIG. 8). Samples from a first device 801 are labeled "A." Samples from a second and third device 801 are labeled "B" and "C," respectively. Samples from many other devices 801 could be similarly represented; however, such samples are not shown for simplicity. The data samples may include mobile key performance indicators, KPI, as described herein, or the data samples may be combined and processed to produce the KPI's. A data sample that arrives at the raw sample collection cluster 802 may include an identifier to the geographic location of the mobile device 801 when the sample was recorded. A data sample may also include a timestamp indicating when the sample was taken. Data in other production pipeline 800 embodiments may include different data.

Further illustrated in FIG. 9A, the horizontal axis of the graph represents geographic locations, organized by HexIDs. In the embodiment, the HexIDs are sequentially ordered, and each HexID represents a virtual hexagon overlying a unique physical location on the earth. Although FIG. 9A is simplified, it is clear that the HPP1 database 804 may have a horizontal axis that includes each HexID in the system such that the surface area of the earth (or other geographic area) is represented.

The vertical axis of the graph in FIG. 9A represents time. Hours are marked, but the time that a data sample is recorded may fall anywhere between the marked hours.

In FIG. 9A, the first device 801 provides samples "A." As time passes in a given day, the first device 801 provides several data samples. Some samples are illustrated as being recorded at the geographic location represented by HexID "1." Subsequently, the user of the first device 801 moves to the geographic location represented by HexID "2." Several samples are taken over time while the first mobile device is at the geographic location represented by HexID "2." As further time passes, the first device moves to the geographic locations represented by HexID's "3," "4," and "5." Data samples provided by the second and third mobile devices 801 are also illustrated according to the times and representations of geographic locations (HexID) associated with the samples.

Although FIG. 9A is simplified to show only a single sample from a device at a single location and time, it is understood that multiple samples can be taken from multiple devices at about the same time (e.g., within seconds or minutes of each other) and from about the same geographic area (e.g., within 50 or 100 feet of each other). In some embodiments, HPP1 database 804 is populated with millions of data samples. In some embodiments, known operations of database maintenance apply weighting criteria to reduce the value of older data samples relative to newer data samples, and other operations purge older or otherwise unreliable data from the database.

Figure 9B:
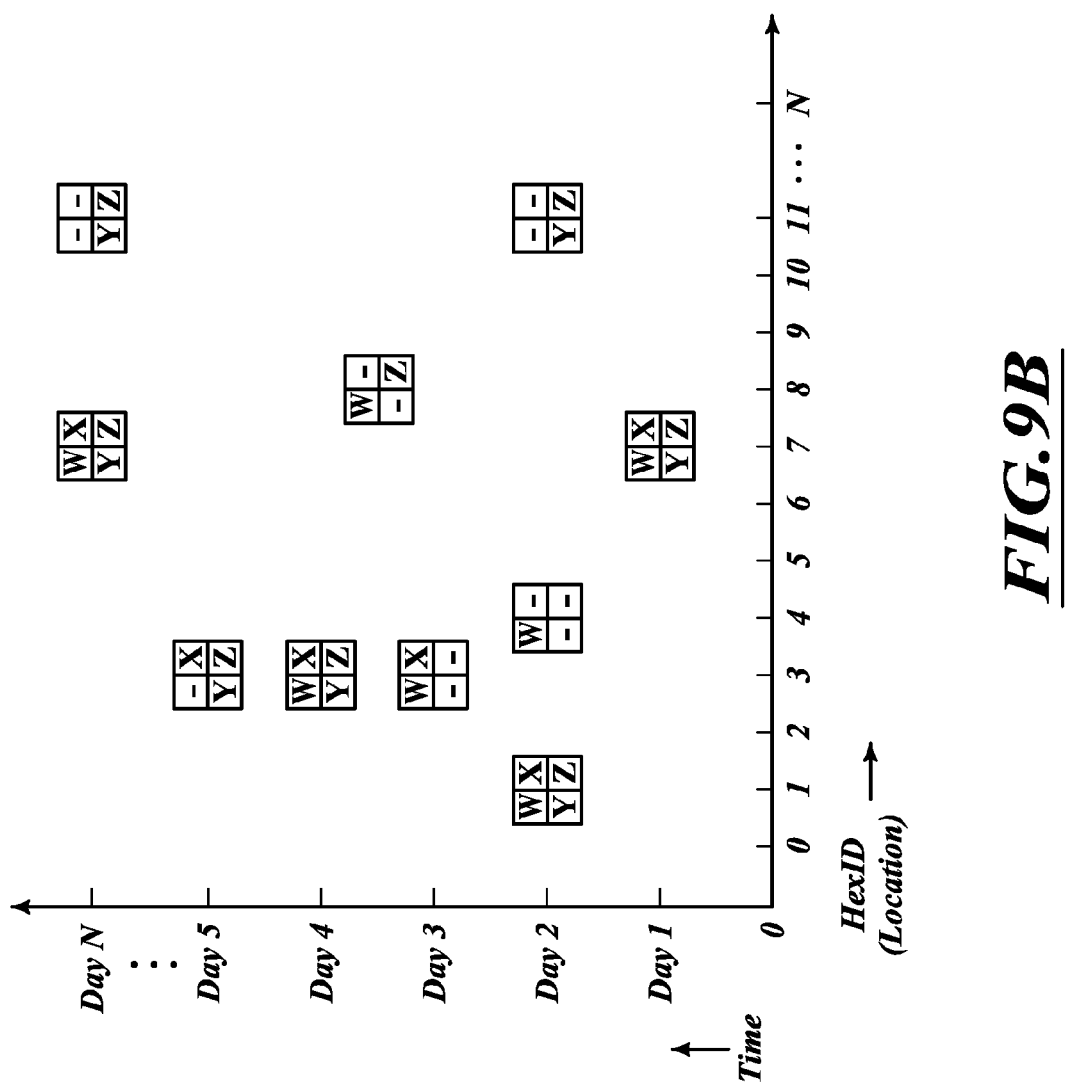
FIG. 9B shows a simplified representation of data flattened in a hexagons per day per carrier (HPP2) database.

FIG. 9B shows a simplified representation of data flattened in a "hexagons per day per carrier" (HPP2) database 806. Data in the HPP2 database 806 is processed and generated from data residing in the HPP1 database 804. In some embodiments, each data sample in the HPP2 database 806 can be traced back to the one or more data samples from the HPP1 database 806 used to derive the HPP2 data sample.

In FIG. 9B, data samples represent mobile key performance indicator data (e.g., signal strength, dropped calls, data throughput, and the like) on a per wireless carrier basis. Such data may be indicative of the quality of network communication services. In FIG. 9B, four wireless carriers "W," "X," "Y," and "Z" are represented. Nevertheless, it is understood that the HPP2 database 806 may represent a different number of wireless carriers or data that is not even associated with wireless communications.

Samples related to a first wireless carrier are labeled "W." Samples related to second, third, and fourth wireless carriers are labeled "X," "Y," and "Z," respectively.

Further illustrated in FIG. 9B, the horizontal axis of the graph represents geographic locations, organized by HexIDs. The vertical axis of the graph in FIG. 9B represents time, in days. In the graph of FIG. 9B, samples are assigned only on a per day basis, but it is recognized that other units of measure or other organizations are possible. In one embodiment, the HPP2 database stores data for a rolling window of eighteen months (e.g., the vertical axis N extends to day 548).

In FIG. 9B, data is aggregated and processed to produce results which may be correlated with a particular HexID. In some embodiments, data for every HexID (geographic location) is initialized and later modified with actual processed, consolidated, and otherwise generated data representative of each carrier's wireless quality at the particular HexID geographic location. Further analysis of the data samples may be used to create statistical information. For example, data may be analyzed based on time, location, measurements, and other criteria to produce mean, median, standard deviation, and other statistical results. In some embodiments, a composite score may be generated from analysis of several data samples related to a particular HexID and, optionally, surrounding HexID's. The data analysis may be performed by any of the computing modules (e.g., HPP1 database 804 or HPP2 database 806 operations, web service API 808, etc.) or by multiple computing modules. Subsequently, when the hexagons are presented on a display device, a user may be "click" on a hexagon and be presented with the results of the analytical operations.

FIG. 9B shows data only at a few HexID's for simplicity. For example, at the geographic location represented by HexID "1," data is generated for Day 2 for each of wireless carriers "W," "X," "Y," and "Z." Also on Day 2, data is generated at HexID "4" only for wireless carrier "W," and data is generated at HexID "11" only for wireless carriers "Y" and "Z." Also illustrated in FIG. 9B, data is generated for the same geographic location (i.e., HexID) on multiple days. For example, at HexID "3," data for carriers "W" and "X" is generated on Day 3, data from all four carriers is generated on Day 4, and data for carriers "X," "Y," and "Z." In subsequent operations of the production pipeline 800, the data from more recent days may be weighted more heavily than data from days further in the past.

Although FIG. 9B is simplified to show a few data samples, the teaching of the HPP2 database graph of FIG. 9B may permit millions of data samples to be stored, retrieved, and maintained.

A web-service API 808 in FIG. 8 operates to prepare data for presentation on a computer display. The web-service API 808 may be configured from one or more computer modules embodied in a computing device such as the data collection system 602 of FIG. 6, the presentation system 640 of FIG. 6, or the computing device 126 of FIG. 5. In the embodiment of the production pipeline 800 of FIG. 8, the web-service API 808 operates on data retrieved from HPP2 database 806, but in other embodiments, the data may be supplied from another source.

In one example, data from the HPP2 database 806 is used by the web service API 808 to characterize and provide data for populating hexagons that are presented on a display device. The characterization may include colorization, gray scaling, texturization, or other features (e.g., display characteristics) to distinguish certain hexagon. The data may include raw data, aged data, extrapolated data, or any other data.

In one embodiment, the web-service API 808 extrapolates information related to the hexagons which will be presented. For example, as illustrated in FIGS. 9A-9B, data samples are organized according to a geographical location that is indexed with a unique HexID. Each HexID is used to represent one hexagon that will be presented as an overlay upon an underlying map display. In some cases, there is no data stored in the database for a particular HexID. In such cases, the web-service API 808 extrapolates data from nearby HexID's. In other cases, data is stored in the database for a particular HexID, but the data is aged. In these cases, data from nearby HexIDs may also be extrapolated and combined with the existing data to generate new data for the particular HexID.

The web-service API 808 of FIG. 8 is configured to provide data samples to a tile service 810. In the embodiment of FIG. 8, the web-service API 808 is capable of providing data for every HexID in the system. Accordingly, in the embodiment of FIG. 8, the earth is covered with a set (e.g., a static grid) of virtual, non-overlapping hexagons, and the web-service API 808 is configured to provide data for each hexagon. In this embodiment, a user may display a map of any portion of the earth on a computer display, and the presented, overlaid hexagons will each have data supplied by the web-service API 808.

The tile service 810 of FIG. 8 communicates with the web-service API 808 to retrieve data related to virtual hexagons. In some cases, the tile service runs continuously, and in other embodiments, the tile service runs once per day. The tile service 810 generates "tiles" that may later be presented on a computer display as an overlay to an underlying map. In the production pipeline 800 of FIG. 8, map clients 820 may interact with web servers 818 to provide input information and retrieve an underlying map for presentation.

For example, in the use of computer equipment such as the presentation system 640 of FIG. 6, a user of a computing device, such as map client 820, may operate the computing device to present a map image on the computer display. The map may be served from one or more web servers 818. The map may appear, for example, as the underlying map of FIG. 7. As described herein, the user may "zoom in" and "zoom out" the map display. The user may "drag" the map display to present other areas of the map on the display.

In one embodiment a map client 820 computing device is used to access a web server 818 that serves map images via the Internet. The web server 818 device has map images stored as discrete files. When a user accesses the web server 818 and provides a geographic area of interest, the web server 818 returns one or more map image files related to the geographic area of interest. As the user "drags" the map image presented on the display, different, adjoining map image files are provided by the web server 818.

The web server 818 may store many sets of map image files. The sets of map image files may be stored in a data repository 816. Each set represents a Mercator projection of a geographic area at a different altitude. A first set of map image files may represent a Mercator projection of the earth when viewed from a first, high altitude (e.g., zoom level "0"). A second set of map image files may represent a Mercator projection of the earth when viewed from a second, lower altitude (e.g., zoom level "1"). A third set of map image files may represent a Mercator projection of the earth when viewed from a third, still lower altitude (e.g., zoom level "2").

In the embodiment, there may be many sets of map image files, which represent many different zoom levels. For example, 21 sets of map image files wherein each set represents one of zoom levels 1-20. The highest zoom level (e.g., zoom level 20), may represent a Mercator projection of the earth when viewed from an altitude of less than 100 feet. The lowest zoom level (e.g., zoom level 0) may represent a Mercator projection of the earth when viewed from an altitude of several thousand feet.

Typically in the embodiment, the number of image files in a set is proportional to the zoom level. A lower zoom level (i.e., when the map is viewed as from a very high altitude) has just a few map image files to represent the entire geographic area. A higher zoom level has large number of map image files to represent the entire geographic area. Typically, the highest zoom level has the greatest number of map image files in the set.

When map image files are presented on a display to the user, the tile service 810 is configured to create an overlying image of virtual hexagons. The virtual hexagons in the overlying image may be generated to appear proportionally and in cooperation with the underlying map image such that when the user zooms, drags, or otherwise manipulates the underlying map image, the virtual hexagon overlay is proportionally manipulated too.

In addition, the user may provide input, which is accepted by the web server modules 818. The input may include an identifier that is unique within the system (e.g., a HexID), wherein the identifier corresponds to an associated hexagonal shape that is rendered on the computer display. The input may arrive as a result of the user "clicking" on a displayed virtual hexagon. Upon receipt of the input, the web server modules 818 may communicate information related to the unique sub-part of the geographic area that corresponds to associated hexagonal shape. The communicated information may represent a measurement of quality of a wireless communication network at the geographic area that corresponds to associated hexagonal shape.

The tile service 810 generates tiles that are configured to overlay an underlying map image. For example, the generated tiles may be in the form of image files that include a hexagon grid but remain largely transparent (i.e., a hexagon image file). In one embodiment, the tile service 810 generates tiles of a fixed geographic size. In other embodiments, the tile service 810 is configured to scale the tile size according to the "zoom" value of the underlying map display. In some cases, tiles are dynamically generated to be rendered on a computing device such as map client 820. In other cases, tiles are generated as hexagon image files and stored in a state database 812.

Tiles stored in state database 812 are typically stored as hexagon image files. In some cases, each hexagon image file corresponds to a map image file. That is, the geographic boundaries of the area represented in a hexagon image file align with the same geographic boundaries area of the area represented in a map image file. In this embodiment, there is a one-to-one correspondence between the map image files and the hexagon image files. When a user wishes to zoom in a map image, the web server 818 serves one or more map image files and the web server 818 also serves one or more corresponding hexagon image files. Similarly, when a user zooms out, drags, or otherwise manipulates the map image, different map image files and corresponding hexagon image files will be served.

FIG. 10 illustrates one embodiment of map image files and hexagon image files brought together for presentation. The production pipeline 800 may collect, aggregate, process, and generate data for presentation as virtual hexagon overlays upon an underlying map image. The computing cluster 814 brings together individual files based on user input, and the files are passed to a map client device 820 for presentation on a computing display device.

In more detail, FIG. 10 illustrates a computing cluster 814. Several map image files 10M1-10M4 are stored in a data repository 816 (FIG. 8). A web server 818 (FIG. 8) receives user input identifying a particular geographic area at a particular zoom level. The web server 818 identifies four map images files 10M1-10M4 that can be displayed to satisfy the user request. In the map image files, various land and water features can be presented on a map client 820 device. The map image files are configured so that when presented on a display, the seams between file images are substantially undetectable.

Also illustrated in FIG. 10, the computing cluster is able to gather four hexagon image files 10H1-10H4. In the embodiment, each of the four hexagon image files is related to a corresponding map image file 10M1-10M4 in a one-to-one relationship. More specifically, map image file 10M1 corresponds to hexagon image file 10H1; map image file 10M2 corresponds to hexagon image file 10H2, etc. It is understood, however, that many other relationships between map image files and hexagon image files are also possible.

The hexagon image files 10H1-10H4 have virtual hexagon representations which are viewed as an overlay to an underlying map image. The virtual hexagons may be colorized, gray-scaled, textured, left transparent, or otherwise characterized. Each hexagon may be identified by an identifier that is unique within the system (HexID). The HexID may be used to generate the hexagon image and its characterization. The HexID may also be used to present additional data related to the associated geographic area (e.g., FIG. 2).

The computing cluster 814 may communicate the map image files 10M1-10M4 and the hexagon image files 10H1-10H4 to the map client device 820. In some embodiments, the map image files and the hexagon image files are stored in the same data repository 816 (FIG. 8) and delivered by the same web-server 818 (FIG. 8), but it is understood that many web servers and data repositories can be configured to supply the map and hexagon image files.

As illustrated in the production pipeline 800, the sets of map image files and hexagon image files may be provided by a computing cluster 814. The computing cluster may include one or more web servers 818 and data repositories 816. The devices that make up the computing cluster 814 may be located in the same place or the devices may be remotely located and communicatively coupled so that map clients 820 may interact with the web servers, send requests, and receive data. The data requests may be load balanced amongst web servers for reasons of data throughput, data efficiency, data redundancy, or many other reasons.

While various items are illustrated and otherwise described as being stored in memory or on storage while being used, these items or portions of them can be transferred between memory and other storage devices for purposes of memory management, data integrity, or for other reasons. In at least some embodiments, the illustrated modules and/or systems are software modules/systems that include software instructions, which when executed by a CPU or other processor, program that processor to automatically perform certain described operations of that module/system. Alternatively, in other embodiments some or all of the software modules and/or systems may execute in memory on another device and communicate with the disclosed computing system/device via inter-computer communication. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. Such computer program products may also take other forms in other embodiments. Accordingly, the present invention may be practiced with other computer system configurations.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary subject based communication facilitation server computing system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method of presenting information, comprising:
   collecting quality of service performance data from a plurality of wireless mobile devices operated by a respective plurality of users;
   associating individual datums of the quality of service performance data with respective individual geographic locations;
   rendering a map of a selected geographic area, the map including a representation of at least some of the individual geographic locations;
   rendering each of the individual geographic locations represented in the rendered map as corresponding ones of a plurality of non-overlapping, mathematically regular polygons, the mathematically regular polygons appearing to overlay the rendered map, each of the mathematically regular polygons bearing information associated with a corresponding individual datum;
   collecting updated quality of service performance data; and
   updating the information associated with one or more corresponding individual datums without updating others of the individual datums, the updating corresponding with collection of additional quality of service performance data.

2. The computer implemented method according to claim 1, comprising:
   receiving a user-selected point of interest; and
   generating a visual representation of the user-selected point of interest on the rendered map.

3. The computer implemented method according to claim 2 wherein the visual representation of the user-selected point of interest includes a ballooned point reference identifier having at least one identifying datum encompassed within the ballooned point reference identifier.

4. The computer implemented method according to claim 2 wherein the user-selected point of interest is associated with a mouse click.

5. The computer implemented method according to claim 2, comprising:
   responsive to the receipt of the user-selected point of interest, generating a child window to present additional quality of service performance data, the child window overlying the rendered map.

6. The computer implemented method according to claim 1 wherein rendering the map includes applying a plurality of colors to the rendered map, each color of the plurality of colors representing a quality of service performance data parameter.

7. The computer implemented method according to claim 1 wherein each mathematically regular polygon has a substantially same size and shape as each other mathematically regular polygon.

8. The computer implemented method according to claim 7 wherein each side of each mathematically regular polygon represents at least 120 meters.

9. The computer implemented method according to claim 7 wherein each mathematically regular polygon is a hexagon.

10. The computer implemented method according to claim 1, comprising:
receiving a user-control input, the user-control input arranged to direct at least one of dragging the rendered map, zooming-in on a first portion of the rendered map, or zooming-out on the first portion of the rendered map.

11. The computer implemented method according to claim 1, comprising:
receiving user input that defines the selected geographic area.

12. A computing system, comprising:
a processing unit, a memory, and an input/output port configured in hardware and software as several modules, said modules including:
a data sample collection module configured to collect data samples;
a polygon production module configured to:
define a plurality of data structures, each of the plurality of data structures associated with its own unique sub-part of a geographic area, and
associate a polygon identifier with each of the plurality of data structures;
a database module configured to:
receive data samples from the data sample collection module,
generate composite information samples from at least some of the data samples, and
store each composite information sample in association with at least one polygon identifier; and
a tile service module configured to:
receive composite information from the database module, and
generate at least one polygon image file, the polygon image file integrating the received composite information, the polygon image file configured for overlay on an underlying map image file.

13. The computing system according to claim 12 wherein the data sample collection module is configured to receive quality of service data samples from a plurality of mobile devices, wherein each quality of service data sample represents at least one performance characteristic of a wireless communication network and wherein each received quality of service data sample includes information representing a geographic location associated with the quality of service data sample.

14. The computing system according to claim 12 wherein the polygon image file includes at least one image of a plurality of non-overlapping, mathematically regular hexagonal shapes.

15. The computing system according to claim 12 wherein the data sample collection module is configured to receive data samples that include at least one of weather information, commercial activity information, educational information, cultural information, or transportation information, and wherein each received data sample includes information representing a geographic location associated with the respective data sample.

16. The computing system according to claim 12 wherein the tile service module is further configured to:
receive user-control input including a polygon identifier, the polygon identifier identifying a selected geographic location corresponding to the polygon identifier;
retrieve additional information associated with the geographic location; and
generate at least one child-window image file including the additional information.

17. The computing system according to claim 12 wherein at least one of the polygon image file and the underlying map image file includes color information differentiating a first composite information sample from a second composite information sample.

18. A non-transitory computer-readable storage medium whose stored contents configure a computing system to perform a method, the method comprising:
collecting data samples associated with a first geographic area;
associating individual datums of the collected data samples with respective individual geographic locations;
rendering a map of a selected geographic area, the map including a representation of at least some of the individual geographic locations;
rendering each of the individual geographic locations represented in the rendered map as corresponding ones of a plurality of non-overlapping polygons, the non-overlapping polygons appearing to overlay the rendered map, each of the non-overlapping polygons bearing information associated with a corresponding individual datum;
collecting at least some updated data samples; and
based on the updated data samples, updating the information associated with corresponding individual datums without updating others of the individual datums.

19. The non-transitory computer-readable storage medium according to claim 18, comprising:
receiving user input selecting a first polygon, the first polygon associated with a first geographic area of interest; and
rendering a child window with additional information, the additional information associated with the selected first polygon or the corresponding first geographic area of interest.

20. The non-transitory computer-readable storage medium according to claim 18 wherein each of the plurality of non-overlapping polygons is a hexagon.

21. The non-transitory computer-readable storage medium according to claim 18, comprising:
associating a polygon identifier with each non-overlapping polygon, each said polygon identifier being unique within the method, each said polygon identifier further being associated with a unique portion of the selected geographic area;
accepting input that selects a polygon identifier; and communicating information related to a portion of the selected geographic area corresponding to the selected polygon identifier.

22. The non-transitory computer-readable storage medium according to claim 21 wherein the communicated information represents quality of service information of a wireless communication network at the geographic area corresponding to the selected polygon identifier.

23. The non-transitory computer-readable storage medium according to claim 18 wherein rendering the map includes coloring portions of the rendered map with at least two colors, each of the at least two colors representing a different characteristic of the collected data samples.

* * * * *